United States Patent
Boehm et al.

(10) Patent No.: US 10,731,786 B2
(45) Date of Patent: Aug. 4, 2020

(54) FLUID-CONDUCTING SYSTEM WITH CATHODIC CORROSION PROTECTION

(71) Applicant: KSB Aktiengesellschaft, Frankenthal (DE)

(72) Inventors: Alexander Boehm, Frankenthal (DE); Karl-Heinz Koefler, Frankenthal (DE); Alexander Puetterich, Frankenthal (DE); Bernd Schramm, Frankenthal (DE); Bjoern Lindell, Billeberga (SE)

(73) Assignee: KSB Aktiengesellschaft, Frankenthal (DE)

( * ) Notice: Subject to any disclaimer, the term of this patent is extended or adjusted under 35 U.S.C. 154(b) by 692 days.

(21) Appl. No.: 14/901,225

(22) PCT Filed: Jun. 18, 2014

(86) PCT No.: PCT/EP2014/062857
§ 371 (c)(1),
(2) Date: Dec. 28, 2015

(87) PCT Pub. No.: WO2014/206839
PCT Pub. Date: Dec. 31, 2014

(65) Prior Publication Data
US 2016/0369935 A1    Dec. 22, 2016

(30) Foreign Application Priority Data
Jun. 28, 2013   (DE) .......................... 10 2013 212 725

(51) Int. Cl.
*F16L 58/18*      (2006.01)
*C23F 13/10*      (2006.01)
(Continued)

(52) U.S. Cl.
CPC ............ *F16L 58/187* (2013.01); *C23F 13/10* (2013.01); *C23F 13/18* (2013.01); *C23F 13/22* (2013.01);
(Continued)

(58) Field of Classification Search
CPC .......... C23F 13/02; C23F 13/06; C23F 13/08; C23F 13/10; C23F 13/18; C23F 13/22;
(Continued)

(56) References Cited

U.S. PATENT DOCUMENTS 3,347,768 A    10/1967  Clark et al.
3,738,383 A  *  6/1973  David .................... F16K 27/12
                                                137/375
(Continued)

FOREIGN PATENT DOCUMENTS

DE     1 253 994     11/1967
DE     76 03 732     7/1976
(Continued)

OTHER PUBLICATIONS

Machine translation of Mueller et al (EP 0598429).*
(Continued)

*Primary Examiner* — Alexander W Keeling
(74) *Attorney, Agent, or Firm* — Crowell & Moring LLP

(57) ABSTRACT

A fluid conducting system with cathodic corrosion protection is provided for at least one device that influences and/or acts upon a flow rate, such as a pump and/or valve. The device includes at least one connection device such as a device connection flange. At least one flow rate guiding device such as a pipe includes a connection means such as a pipe connection flange. The system includes annular anodes arranged between the connection devices and connection means, where anodes are electrically connected by electrical conducting lines to a monitoring device. The
(Continued)

internal diameter of the anodes is preferably equal to the internal diameter of the flow rate guiding device and/or the inner diameter of the inlet and/or outlet of flow influencing device.

9 Claims, 4 Drawing Sheets

(51) Int. Cl.

| | | |
|---|---|---|
| *C23F 13/18* | (2006.01) | |
| *C23F 13/22* | (2006.01) | |
| *F16L 23/00* | (2006.01) | |
| *F04D 29/42* | (2006.01) | |
| *F04D 7/06* | (2006.01) | |
| *F16K 3/02* | (2006.01) | |

(52) U.S. Cl.
CPC ............ *F04D 7/06* (2013.01); *F04D 29/426* (2013.01); *F04D 29/4293* (2013.01); *F16K 3/02* (2013.01); *F16L 23/006* (2013.01); *C23F 2213/32* (2013.01)

(58) Field of Classification Search
CPC ....... C23F 2213/32; F16L 58/00; F16L 58/18; F16L 58/187
See application file for complete search history.

(56) References Cited

U.S. PATENT DOCUMENTS

| | | | |
|---|---|---|---|
| 4,713,158 A | 12/1987 | Lambert | |
| 5,333,913 A * | 8/1994 | Stallard, III | F16L 25/026 285/288.5 |
| 5,739,424 A * | 4/1998 | Beavers | C23F 13/00 204/196.02 |
| 2002/0179429 A1 | 12/2002 | Showcatally | |
| 2004/0031697 A1 | 2/2004 | Breault | |
| 2008/0047842 A1 | 2/2008 | Beavers et al. | |

FOREIGN PATENT DOCUMENTS

| | | | |
|---|---|---|---|
| DE | 42 38 751 A1 | 5/1994 | |
| EP | 0598429 A1 * | 5/1994 | ............. C23F 13/06 |
| JP | 2002-242874 A | 8/2002 | |
| JP | 2002-295389 A | 10/2002 | |
| JP | 2002-295390 A | 10/2002 | |
| KR | 10-0540390 B1 | 12/2005 | |
| WO | WO-2004029590 A1 * | 4/2004 | ............. G01N 17/02 |

OTHER PUBLICATIONS

International Preliminary Report on Patentability (PCT/IB/373) issued in PCT Application No. PCT/EP2014/062857 dated Dec. 29, 2015, including English translation of Written Opinion (PCT/ISA/237) (seven (7) pages).
International Search Report (PCT/ISA/210) issued in PCT Application No. PCT/EP2014/062857 dated Dec. 1, 2014, with English translation (six (6) pages).
German Examination Report issued in counterpart German Application No. 10 2013 212 725.1 dated Jan. 31, 2014 (seven (7) pages).

\* cited by examiner

FLUID-CONDUCTING SYSTEM WITH CATHODIC CORROSION PROTECTION

This application is a national stage of PCT International Application No. PCT/DE2014/062857, filed Jun. 18, 2014, which claims priority to German patent application: DE 10 2013 212 725.1, filed Jun. 28, 2013 in the German Patent Office, the disclosures of which are herein incorporated by reference in their entirety.

BACKGROUND AND SUMMARY OF THE INVENTION

The invention relates to a fluid-conducting system with cathodic corrosion protection, having at least one device conveying and/or influencing a flow rate, in particular a pump and/or valve having at least one connection device, and having at least one device guiding a flow rate, in particular a pipe element, having connection means.

Fluid-conducting systems of this type having pumps or valves are widespread and are often used to convey and influence corrosive fluids or media, whereby the inner walls exposed to the fluid or medium sustain damage and parts of the system or of the devices have to be replaced after a certain time.

In order to protect pumps or valves against corrosion, it is known for example from South Korean patent document KR 100540390 B1 to attach a bolt connecting the casing of an valve to a water pipe to a sacrificial anode.

Pumps are also known that have sacrificial anodes arranged inside the casing. Examples for this include Japanese patent documents JP 2002295389 A, JP 2002295390 A or JP 2002242874 A.

The disadvantage with both variants lies in the fact that recurring maintenance works have to be performed and, in particular with internal sacrificial anodes, the entire system has to be switched off.

German utility patent document no. DE 7603732 U discloses a water container in the lower region of which an electric heating element is arranged. A passive anti-corrosion layer made of enamel is formed on the inner wall of the container. Furthermore, electrodes supplied with external current and providing cathodic corrosion protection are provided, wherein the electrodes can be set to an optimal potential by means of a potentiostat and a reference electrode, and at least one external current anode is arranged in the vicinity of the heating element. An arrangement of this type, however, has proven to be unsuitable for systems having a relatively high flow.

The object of the invention is to provide a fluid-conducting system or a device conveying or influencing a flow rate, having a cathodic corrosion protection system, in which the above-mentioned disadvantages are overcome, without disturbing the flow rate in the device or a pipe system connected thereto.

The object is achieved in accordance with the invention in that the fluid-conducting system comprises annular anodes, wherein an anode is arranged in each case between a first and a second connection device and/or between a first connection device and a connection means and/or between a second connection device and a connection means, the anodes are electrically connected to a monitoring arrangement by means of lines comprising one or more conductors, and the inner diameter of the anodes is equal to the inner diameter of the device guiding a flow rate and arranged on the respective anode.

According to the invention, in a further embodiment, the inner diameter of the anodes also corresponds to the inner diameter of the inflow or outflow opening, assigned to the respective anode, of the device conveying or influencing a flow rate. Turbulences and/or flow vortices in the fluid-conducting system are thus prevented.

In a further embodiment one or more threaded bores are provided in the casing, into which bores reference electrodes electrically conductively connected to the casing are screwed. It is thus possible to bring the reference electrodes into contact with the fluid or the flow rate within the casing without said electrodes protruding into the casing or without a dead space forming, i.e. a blind hole-like indentation. At the same time, this opening in the casing can be easily sealed.

The fact that the reference electrodes are arranged relative to one another in such a way that the greatest possible inner surface of the casing can be balanced in terms of the potential enables the system to be reliably operated. A state monitoring of all surfaces within the casing contacted by a medium or fluid is thus reliably ensured.

In accordance with a further embodiment, in order to optimize the operation, the monitoring arrangement comprises a control or regulation unit, a first rectifier, a second rectifier and a measuring module.

It is proposed in accordance with the invention for an annular and electrically insulating first insulation washer to be arranged between the anode and the first or the second connection device and also for an electrically insulating second insulation washer to be arranged between the anode and the connection means. It is thus possible to compensate for varying distances between the casing of the pump or the valve using insulation washers of different thickness or by using a number of insulation washers.

In order to ensure reliable insulation protection, bores are provided in accordance with the invention in the first and/or second connection device and in the connection device of the pipe elements, there being electrically insulating insulation sleeves arranged in said bores. These are preferably inserted into the bores for simple assembly.

In order to increase the insulation protection, the insulation sleeves at their free end have a collar.

The invention is also achieved by a device conveying or influencing a flow rate, in particular a pump arrangement or valve arrangement for a fluid-conducting system with cathodic corrosion protection.

Other objects, advantages and novel features of the present invention will become apparent from the following detailed description of one or more preferred embodiments when considered in conjunction with the accompanying drawings.

DETAILED DESCRIPTION

Figure 1:
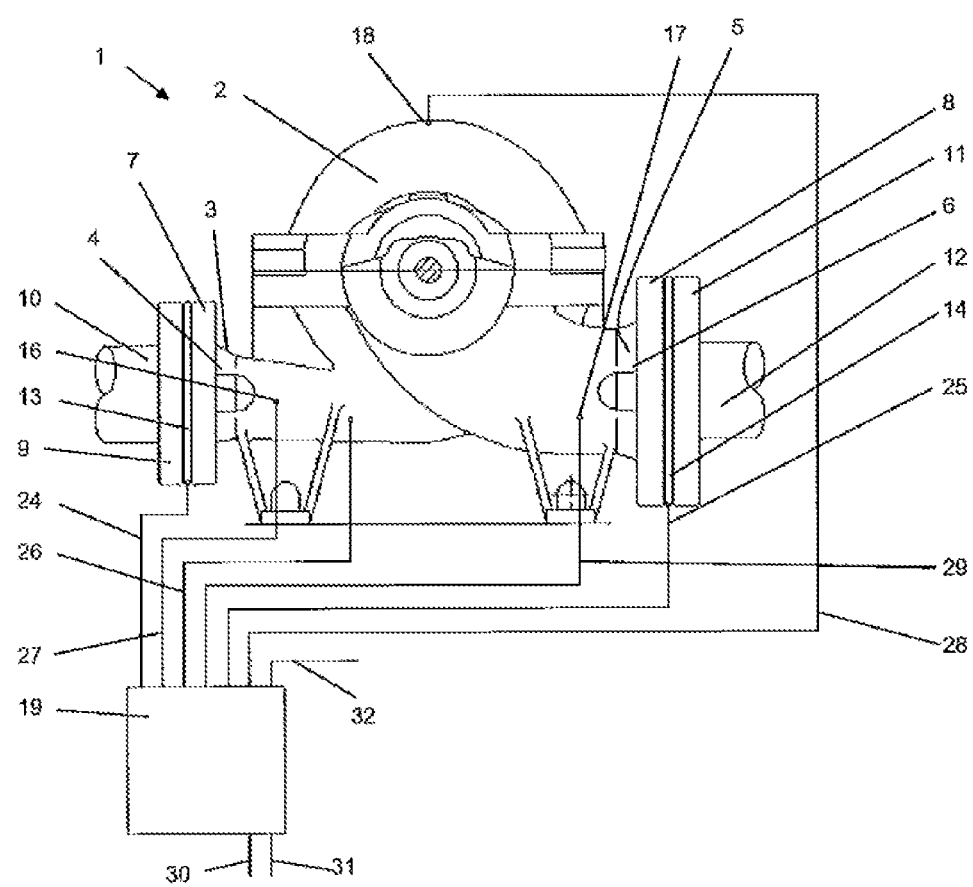
FIG. 1 shows the side view of a horizontally divided spiral casing pump attached to a pipe system and connected to a control and monitoring device in accordance with an embodiment of the present invention.

A device 1 conveying a flow rate is illustrated in FIG. 1, said device being in the form of a horizontally divided spiral casing pump for a fluid-conducting system, wherein the device 1 conveying a flow rate comprises a casing 2 having an inlet connection piece 3 and an inflow opening 4 and an outlet connection piece 5 having an outflow opening 6. A first connection device 7 is formed at the inflow opening 4 and a second connection device 8 is formed at the outflow opening 6, in each case in the form of a flange. Whereas the first connection device 7 is attached to a connection means 9, for example a connection flange, of a pipe element 10, the second connection device 8 of the device 1 conveying a flow rate is attached to a connection device 11 of a pipe element 12.

Figure 4:
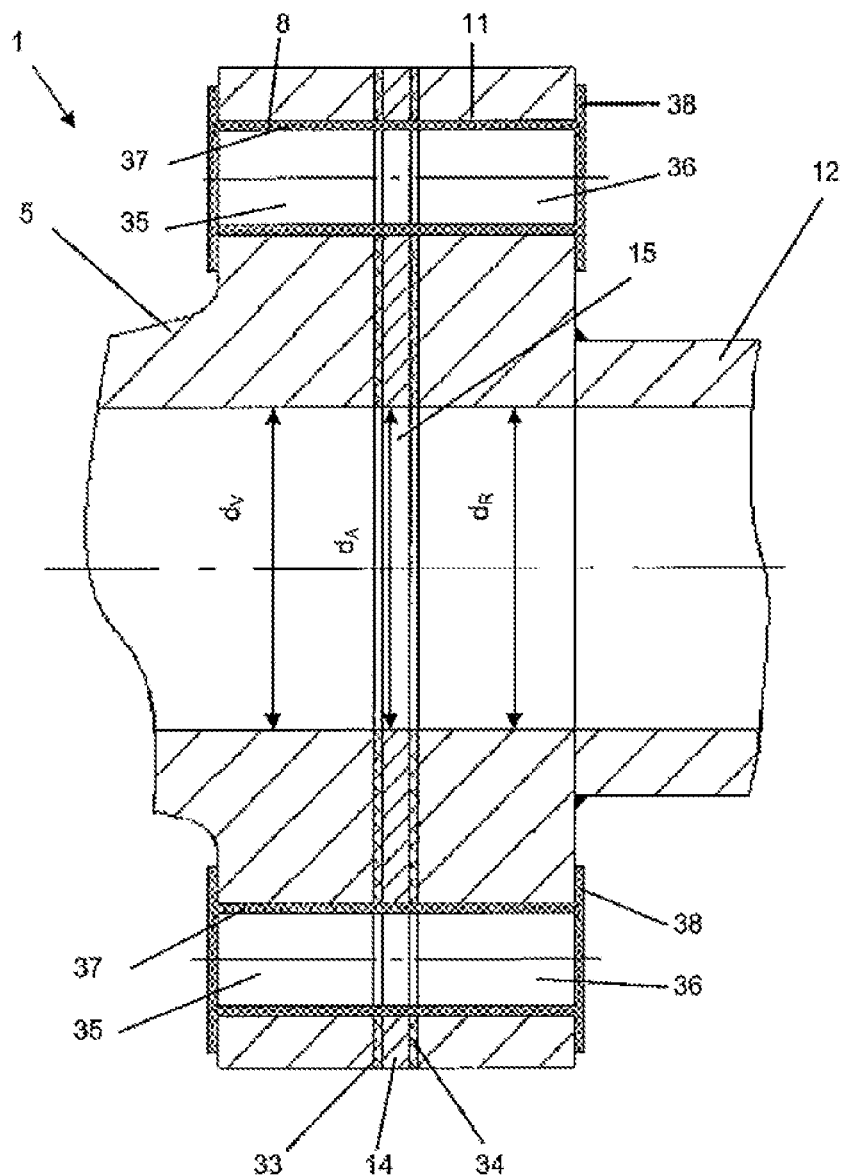
FIG. 4 shows a detailed section view of the connection region of the spiral casing pump and of the pipe system in accordance with an embodiment of the present invention.

An annular first anode 13 formed as an external current anode and insulated with respect to the connection device 7 and the connection means 9 is arranged between the first connection device 7 of the device 1 conveying a flow rate and the connection means 9 of the pipe element 10. An annular second anode 14 formed as an external current anode and insulated with respect to the connection devices 8 and the connection means 11 is arranged between the second connection device 8 of the device 1 conveying a flow rate and the connection means 11 of the pipe element 12. The inner diameter $d_A$ of the anodes 13 and 14, as shown in detail in FIG. 4, corresponds to the inner diameter $d_R$ of the pipe elements 10 and 12 assigned to the anodes 13 and 14 respectively and corresponds to the inner diameters $d_v$ of the inflow or outflow opening, arranged on the anodes 13 and 14, of the device 1 conveying a flow rate. The anodes 13 and 14 therefore do not protrude into the flow path of the flow rate and also do not form any 'dead spaces', i.e. indentations, for example annular groove-like indentations, in which turbulences may occur. The anodes 13 and 14, which are produced substantially from a titanium alloy, are coated at the region contacting the fluid or the flow rate with a substrate 15, as illustrated in FIG. 4, formed from a mixture of different metal oxides, for example iridium, tantalum and/or ruthenium.

A threaded bore (not illustrated) is provided on the inlet connection piece 3, there being a first reference electrode 16 screwed into said bore. The outlet connection piece 5 also comprises a threaded bore (not illustrated), into which a second reference electrode 17 is screwed. A third reference electrode 18 is screwed on the upper side of the casing 2 into a further threaded bore (not shown). First, second and third reference electrodes are electrically conductively connected to the casing 2, screwed into the bores. The reference electrodes, which are preferably produced from pure zinc, silver or a silver alloy, come directly into contact with the fluid or flow rate within the casing 2 without protruding into the casing interior or forming a dead space, i.e. a blind hole-like indentation. In the case of the spiral casing pump 1 shown in FIG. 1, three reference electrodes are preferably used, however the number of reference electrodes can be increased or reduced as necessary, in particular with different casing forms.

The reference electrodes 16, 17 and 18 are preferably arranged relative to one another such that they can balance the greatest possible inner surface of the casing in terms of the potential. In FIG. 1 a monitoring arrangement 19 is also shown, which for example is accommodated in a switch cabinet. The monitoring arrangement 19 has a control or regulation unit 20, a first rectifier 21, a second rectifier 22 and a measuring module 23, as shown in greater detail in FIG. 2. A line 24 comprising one or more conductors leads from the first rectifier 21 to the first anode 13. The second rectifier 22 is connected to the second anode 14 via a line 25 comprising one or more conductors. The casing 2 is attached both to the first rectifier 21 and to the second rectifier 22 via a line 26 comprising one or more conductors. The measuring module 23 is attached to the first reference electrode 16 by means of a line 27 comprising one or more conductors and is connected to the third reference electrode 18 via a line 28 comprising one or more conductors. A line 29 comprising one or more conductors leads to the second reference electrode 17. A line 30 comprising one or more conductors can be guided to further, external input/output devices, measuring and/or monitoring arrangements, or computers (not illustrated).

The monitoring arrangement 19 is also supplied with electrical energy from a conventional AC voltage source via a supply line 31. The monitoring arrangement 19 is preferably additionally attached to an alarm bus line 32.

Figure 3:
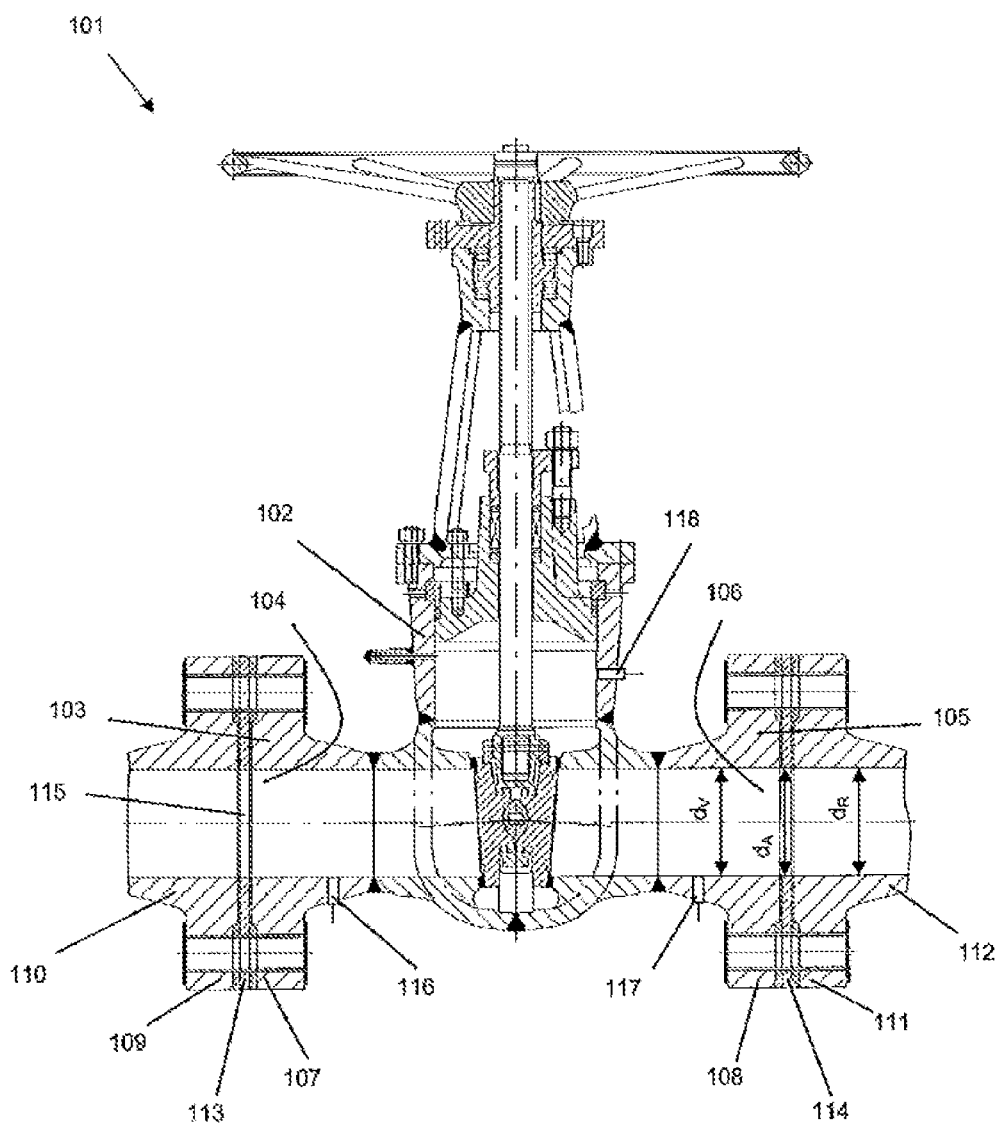
FIG. 3 shows a sectional view of an valve attached to a pipe system in accordance with an embodiment of the present invention.

FIG. 3 shows a device 101 influencing a flow rate in the form of an valve, in particular a gate valve, for a fluid-conducting system. The device 101 influencing a flow rate comprises a casing 102 having an inlet connection piece 103 and an inflow opening 104 and an outlet connection piece 105 having an outflow opening 106. A first connection device 107 is formed at the inflow opening 104 and a second connection device 108 is formed at the outflow opening 106, in each case in the form of a flange. The first connection device 107 is attached to a connection means 109 of a pipe element 110, and the second connection device 108 of the device 101 influencing a flow rate is attached to a connection means 111 of a pipe element 112.

An annular first anode 113 insulated with respect to the connection device 107 and the connection means 109 is arranged between the first connection device 107 of the device 101 influencing a flow rate and the connection means 109 of the pipe element 110. An annular second anode 114 insulated with respect to the connection device 108 and the connection means 111 is arranged between the second connection device 108 of the valve 101 and the connection means 111 of the pipe element 112. The inner diameter $d_A$ of the anodes 113 and 114 corresponds substantially to the inner diameter $d_R$ of the pipe elements 110 and 112 and to the inner diameter $d_v$ of the inflow or outflow opening 104 and 106 respectively. The structure of the anodes corresponds to the structure described with reference to FIG. 1.

A first reference electrode 116 is screwed into a threaded bore at the inlet connection piece 103. A second reference electrode 117 is screwed into a threaded bore in the outlet connection piece 105. As necessary, a third reference electrode 118 can be screwed into a further threaded bore in the upper part of the casing 102. First, second and third reference electrodes are screwed into the bores and in so doing are electrically conductively connected to the casing 102. The reference electrodes come directly into contact with the fluid inside the casing 2 without protruding into the valve interior or without forming a dead space.

Figure 2:
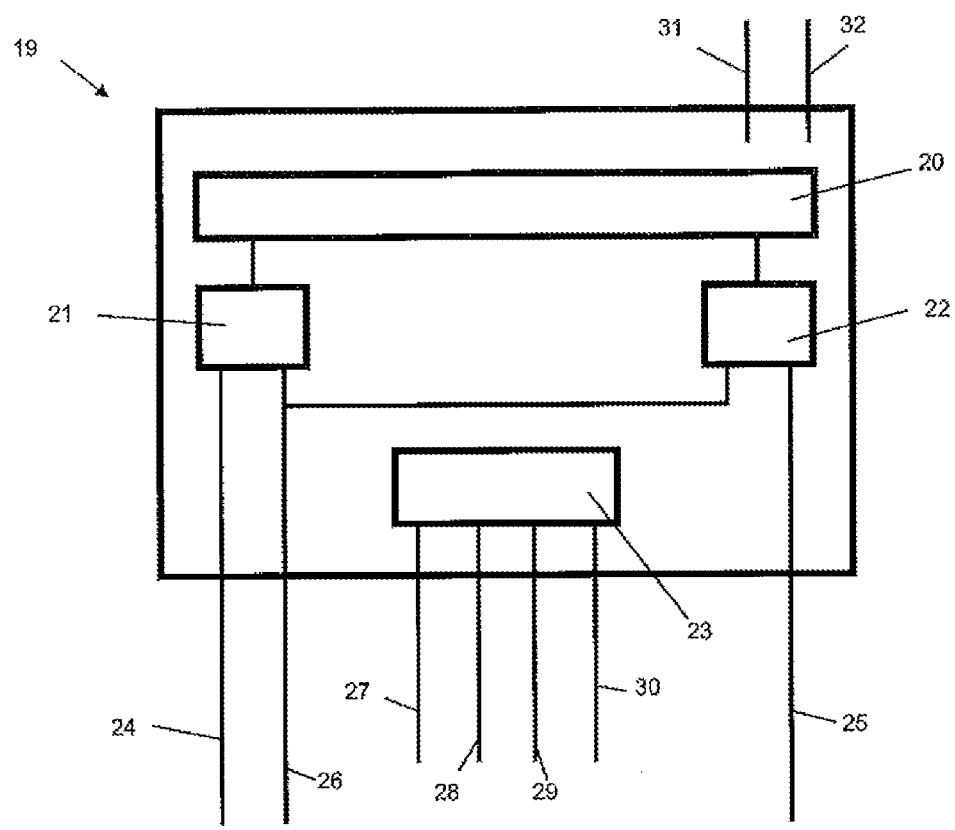
FIG. 2 shows a schematic diagram of a monitoring arrangement in accordance with an embodiment of the present invention.

The attachment of the casing 102, the reference electrodes 116, 117 and 118 and of the anodes 113 and 114 to a monitoring unit (not illustrated here) is performed in accordance with the circuit examples shown in FIG. 1 and FIG. 2.

FIG. 4 shows the detailed illustration of the outlet connection piece 5 of the device 1 conveying a flow rate, with the pipe element 12. The second anode 14 is arranged between the second connection device 8 of the device 1 conveying a flow rate and the connection device 11 of the pipe element 12. An annular and electrically insulating first insulation washer 33 is arranged between the second anode 14 and the second connection device 8 of the device 1 conveying a flow rate. An annular and electrically insulating second insulation washer 34 is arranged between the second anode 14 and the connection device 11 of the pipe element 12. The inner diameter (not designated in greater detail in the figures) of the insulation washers corresponds to the inner diameters $d_A$ of the anodes and the inner diameters of the inflow or outflow openings of the device 1 conveying a flow rate. Bores 35 are provided in the second connection device 8, and bores 36 are provided in the connection device 11. Electrically insulating insulation sleeves 37 are inserted into the bores 35 and 36. The insulation sleeves can be formed in one or more parts and where appropriate may have at their free end a collar 38, on which a screw head or a screw nut (not illustrated) come into abutment. Electrically insulating separate washers can also be used optionally. This arrangement of external current anode, insulation washers and insulation sleeves is also provided for the inlet connection piece of the device 1 conveying a flow rate and for inlet and outlet connection pieces of the device 101 influencing a flow rate.

In the monitoring arrangement 19 shown in FIGS. 1 and 2 the direct current required for the cathodic protection is generated and is guided via the line 24 from the first rectified 21 to the anode 13 and from the second rectifier 22 via the line 25 to the second anode 14. The purpose of the monitoring arrangement 19 lies primarily in balancing the signals sent via the reference electrodes 16, 17 and 18 in terms of the potential within the pump casing with the preset limit values and, where appropriate, in adapting these via the direct current guided across the anodes 13 and 14. This is true equally also for the device 101 influencing a flow rate illustrated in FIG. 3 and having the anodes 113 and 114 and the reference electrodes 116, 117 and 118.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 device conveying a flow rate
2 pump casing
3 inlet connection piece
4 inflow opening
5 outlet connection piece
6 outflow opening
7 first connection device
8 second connection device
9 connection means
10 pipe element
11 connection means
12 pipe element
13 first anode
14 second anode
15 substrate
16 first reference electrode
17 second reference electrode
18 third reference electrode
19 monitoring arrangement
20 control or regulation unit
21 first rectifier
22 second rectifier
23 measuring module
24 line
25 line
26 line
27 line
28 line
29 line
30 line
31 supply line
32 alarm bus line
33 first insulation washer
34 second insulation washer
35 bore
36 bore
37 insulation sleeve
38 collar
101 device influencing a flow rate
102 casing
103 inlet connection piece
104 inflow opening
105 outlet connection piece
106 outflow opening
107 first connection device
108 second connection device
109 connection device
110 pipe element
111 connection device
112 pipe element
113 first anode
114 second anode
115 substrate
116 first reference electrode
117 second reference electrode
118 third reference electrode

The invention claimed is:

1. A fluid-conducting system with cathodic corrosion protection, comprising:
at least one of a pump and a valve device configured to at least one of convey and influence a flow rate and having at least two connection devices;
at least two flow rate guiding devices having connection means configured to be connected to the at least two connection devices;
annular anodes configured to be arranged between a first connection device of the at least two connection devices and a first connection means of the at least two connection means and between a second connection device of the at least two connection devices and a second connection means of the at least two connection means;
at least two reference electrodes; and
a monitoring arrangement electrically connected to the annular anodes by lines having one or more conductors, wherein
the at least one of the pump and the valve device includes a casing with at least two threaded bores,
each of the at least two threaded bores is configured to receive in an electrically conductive manner one of the at least two reference electrodes,
the at least two reference electrodes are located on the casing remote from the annular anodes in a manner which provides electrical potential balance of an inner surface of the casing, and an inner diameter of the annular anodes is equal to an inner diameter of an adjacent one of the at least two flow rate guiding devices.

2. The fluid-conducting system as claimed in claim 1, wherein the at least two flow rate guiding devices are pipe elements.

3. The fluid-conducting system as claimed in claim 1, wherein the inner diameter of the annular anodes corresponds to an inner diameter of an adjacent one of an inflow or outflow opening of the at least one of the pump and the valve device.

4. The fluid-conducting system as claimed in claim 1, wherein the at least two reference electrodes are arranged relative to one another to maximize the electrical potential balance of an inner surface of the casing.

5. The fluid-conducting system as claimed in claim 1, wherein the monitoring arrangement includes a control unit, a first rectifier, a second rectifier, and a measuring module.

6. The fluid-conducting system as claimed in claim 5, wherein the at least two reference electrodes are electrically connected to the monitoring arrangement.

7. The fluid-conducting system as claimed in claim 6, further comprising:

an annular and electrically insulating first insulation washer arranged between one of the annular anodes and the adjacent one of the at first and second connection devices; and an annular and electrically insulating second insulation washer arranged between another of the annular anodes and the adjacent one of the first and second connection means.

8. The fluid-conducting system as claimed in claim 7, further comprising:

at least one electrically insulating sleeve configured to be located within co-axial bores of the at least one of the first and second connecting devices and the adjacent one of the first and second connection means.

9. The fluid-conducting system as claimed in claim 8, wherein the at least one electrically insulating sleeve includes a collar at a free end.

\* \* \* \* \*